United States Patent [19]

Hooser

[11] Patent Number: 4,856,418
[45] Date of Patent: Aug. 15, 1989

[54] AUTOMOBILE VENTILATION DEVICE

[76] Inventor: Delton D. Hooser, 704 Orchard Manor Dr., Boonsboro, Md. 21713

[21] Appl. No.: 196,505

[22] Filed: May 20, 1988

[51] Int. Cl.⁴ ............................................. B60H 1/30
[52] U.S. Cl. ........................................ 98/2.13; 98/2; 98/93
[58] Field of Search ................. 98/2, 2.12, 2.13, 2.18, 98/9, 13, 93

[56] References Cited

U.S. PATENT DOCUMENTS

| | | | |
|---|---|---|---|
| D. 297,527 | 9/1988 | Iacovelli | D10/2 |
| 451,465 | 5/1891 | Dirkes | 98/93 |
| 931,183 | 8/1909 | Cummings | 98/93 |
| 973,513 | 10/1910 | Kempski | 98/93 |
| 1,518,715 | 12/1924 | Walker | 98/2.13 |
| 1,770,945 | 7/1930 | Pomrenke | 98/2.13 |
| 1,847,861 | 3/1932 | Bradbury | 98/2.13 |
| 2,251,511 | 8/1941 | Burke | 98/2.13 |
| 2,470,799 | 5/1949 | Ames | 98/13 X |
| 3,434,408 | 3/1969 | Rivers et al. | 98/2.13 |
| 3,730,070 | 5/1973 | Pedersen | 98/2.13 X |
| 4,111,106 | 9/1978 | Burns | 98/2.13 |

*Primary Examiner*—Harold Joyce
*Attorney, Agent, or Firm*—Jerry T. Kearns

[57] ABSTRACT

An automobile ventilation device utilizes a transparent rectangular mounting plate having top and bottom flanged ends for engagement in the window channel of a vehicle. An airscoop for directing air into and out of the interior of a vehicle has a louvered air inlet and a louvered air outlet. A control valve arrangement may be adjusted to regulate air flow through the air inlet into the vehicle interior and may also be adjusted to exhaust air from the vehicle interior through the air outlet via an induction effect. Adjustable vent slats enable vehicle occupants to regulate the volume and direction of the air flow within the vehicle. The device includes a thermometer for indicating exterior ambient air temperature and a compass for indicating vehicle direction. The device may be inverted for use on either side of a vehicle.

6 Claims, 4 Drawing Sheets

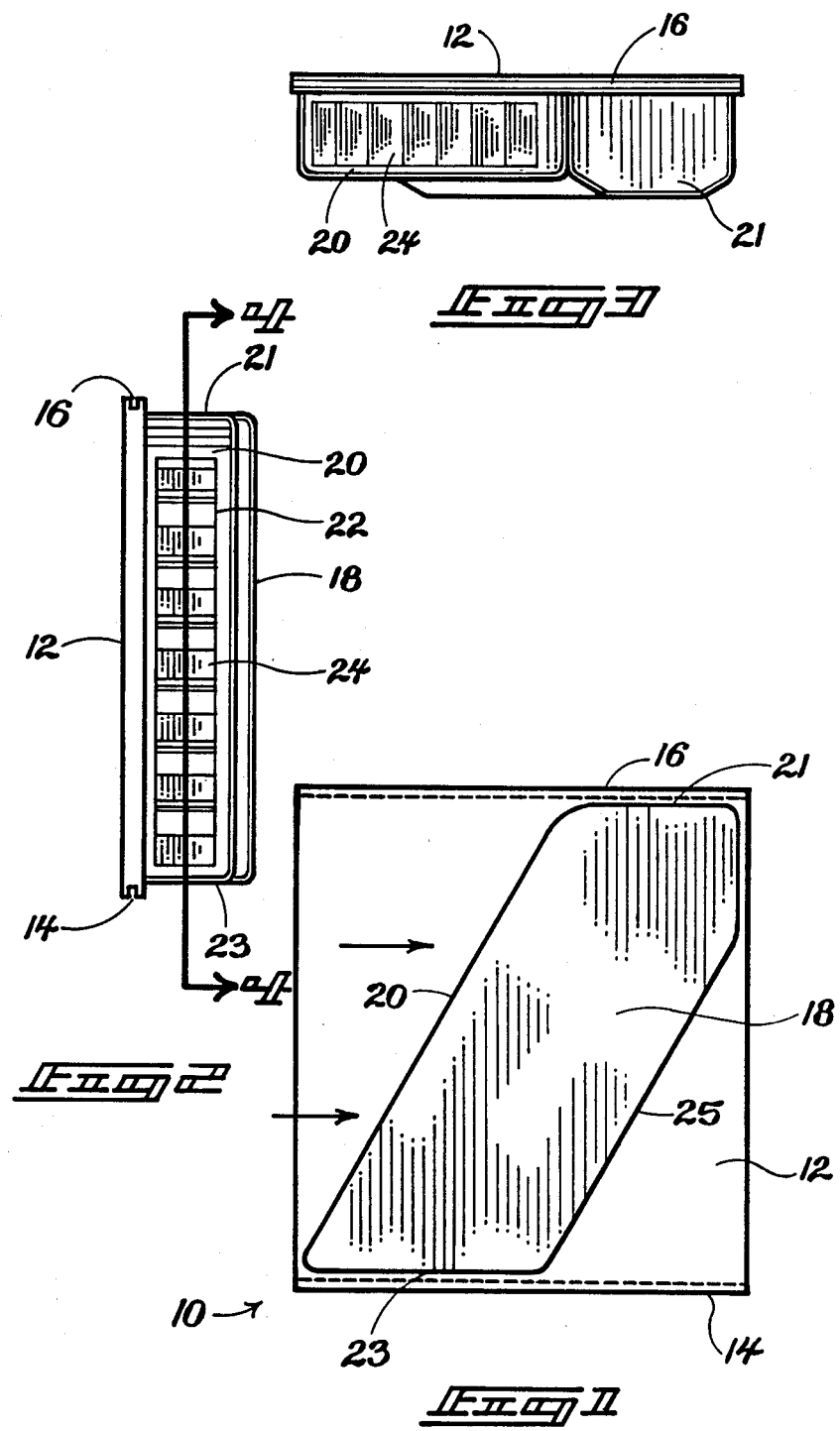

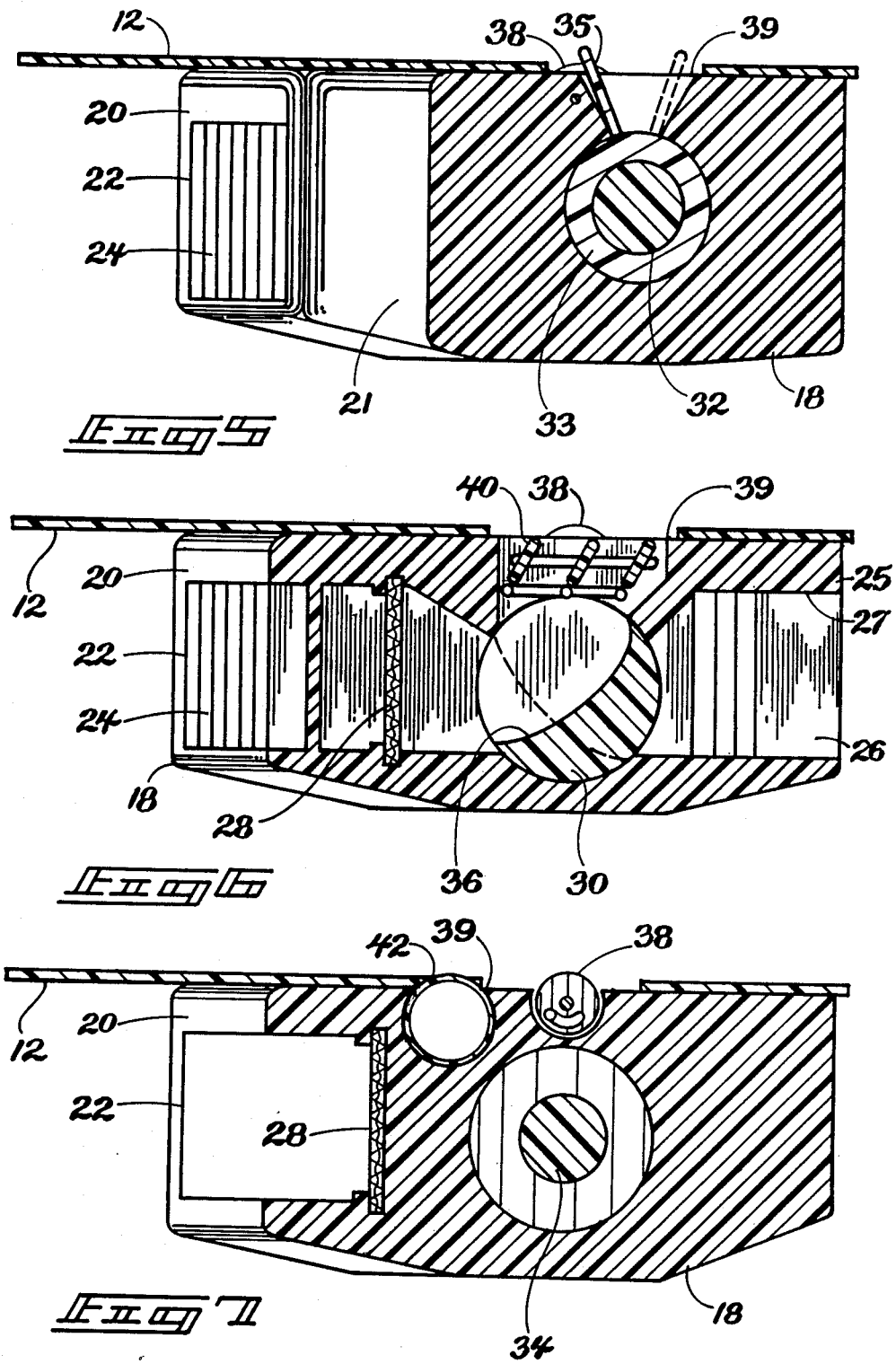

AUTOMOBILE VENTILATION DEVICE

BACKGROUND OF THE INVENTION

1. Field of the Invention

The present invention relates to ventilation devices, and more particularly pertains to an improved airscoop ventilation device for exchanging air within the interior of a motor vehicle. Many newer automobiles are not provided with external air vents. This results in air within a vehicle becoming stale and stagnated. The problem is aggravated if the vehicle occupants are smokers. Merely rolling down a window does not adequately induct air into the vehicle interior. Additionally, rolling down vehicle windows creates excessive noise, especially at high speed. In order to overcome these problems, the present invention provides an automobile ventilation device which may be fitted into a window channel and utilized to circulate air through a vehicle interior in a controlled fashion.

2. Description of the Prior Art

Various types of ventilation devices are known in the prior art. A typical example of such an automobile ventilation device is to be found in U.S. Pat. No. 1,770,945, which issued to L. Pomrenke on July 22, 1930. This patent discloses a rectangular panel having a series of inclined baffles for inducting air into a vehicle interior. The device is adapted to be mounted in a vehicle window channel. U.S. Pat. No. 2,251,511, which is issued to J. Burke on Aug. 5, 1941, discloses a ventilation device adapted for mounting in a vehicle window channel. The device utilizes a streamlined cowl to direct air through a vent opening into the vehicle interior. U.S. Pat. No. 3,434,408, which issued to J. Rivers et al on Mar. 25, 1969, discloses a vehicle window air vent which utilizes a plurality of streamlined cowls which are angularly oriented to direct air through ventilation openings into a vehicle interior. U.S. Pat. No. 3,730,070, which issued to R. Pedersen on May 1, 1973, discloses a wind driven rear window defroster adapted to be mounted in the side window space of a vehicle so as to circulate and direct warm air from the interior of the car onto the rear window for defrosting purposes. The circulating fan is driven by a wind driven impeller located outside the vehicle. U.S. Pat. No. 4,111,106, which issued to W. Burns on Sept. 5, 1978, discloses a ventilation system for vehicles adapted to be mounted in the vehicle window channel. The device utilizes a mounting plate having flanged top and bottom edges for engagement with the window channel. An external airscoop for forcing air into the automobile interior is pivotally mounted on the flanged plate.

While the above mentioned devices are suited for their intended usage, none of these devices utilize an adjustable valve for allowing air to be selectively inducted into or exhausted from the interior of a vehicle. Additional features of the present invention not disclosed in the aforesaid devices include the provision of adjustable vents for regulating air direction and volume of air flow within the interior of a vehicle, a thermometer for indicating exterior air temperature and a compass for indicating vehicle direction. Inasmuch as the art is relatively crowded With respect to these various types of ventilation devices, it can be appreciated that there is a continuing need for and interest in improvements to such ventilation devices, and in this respect, the present invention addresses this need and interest.

SUMMARY OF THE INVENTION

In view of the foregoing disadvantages inherent in the known types of ventilation devices now present in the prior art, the present invention provides an improved automobile ventilation device. As such, the general purpose of the present invention, which will be described subsequently in greater detail, is to provide a new and improved automobile ventilation device which has all the advantages of the prior art ventilation devices and none of the disadvantages.

To attain this, a representative embodiment of the concepts of the present invention is illustrated in the drawings and makes use of a transparent rectangular mounting plate having top and bottom flanged ends for engagement in the window channel of a vehicle. An airscoop for directing air into and out of the interior of a vehicle has a louvered air inlet and a louvered air outlet. A control valve arrangement may be adjusted to regulate air flow through the air inlet into the vehicle interior and may also be adjusted to exhaust air from the vehicle interior through the air outlet via an induction effect. Adjustable vent slats enable vehicle occupants to regulate the volume and direction of the air flow within the vehicle. The device includes a thermometer for indicating exterior ambient air temperature and a compass for indicating vehicle direction. The device may be inverted for use on either side of a vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile ventilation device which has all the advantages of the prior art ventilation devices and none of the disadvantages.

It is another object of the present invention to provide a new and improved automobile ventilation device which may be easily and efficiently manufactured and marketed.

It is a further object of the present invention to provide a new and improved automobile ventilation device which is of a durable and reliable construction.

An even further object of the present invention is to provide a new and improved automobile ventilation device which is susceptible of a low cost of manufacture with regard to both materials and labor, and which accordingly is then susceptible of low prices of sale to the consuming public, thereby making such ventilation devices economically available to the buying public.

Still yet another object of the present invention is to provide a new and improved automobile ventilation device which provides in the apparatuses and methods of the prior art some of the advantages thereof, while simultaneously overcoming some of the disadvantages normally associated therewith.

Still another object of the present invention is to provide a new and improved automobile ventilation device which is adapted to be mounted in the window channel of a vehicle.

Yet another object of the present invention is to provide a new and improved automobile ventilation device which is provided with an adjustable air control valve and adjustable air vents for regulating the volume and direction of air flow within the interior of a vehicle.

Even still another object of the present invention is to provide a new and improved automobile ventilation device which is adapted to be inverted for use on either side of a motor vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is a side view of the ventilation device of the present invention.

FIG. 2 is a front view of the ventilation device of the present invention.

FIG. 3 is a top view of the ventilation device of the present invention.

FIG. 5 is a transverse cross sectional view, taken along line 5—5 of FIG. 4.

FIG. 6 is a transverse cross sectional view, taken along line 6—6 of FIG. 4.

FIG. 7 is a transverse cross sectional view, taken along line 7—7 of FIG. 4.

DESCRIPTION OF THE PREFERRED EMBODIMENT

Figure 4:
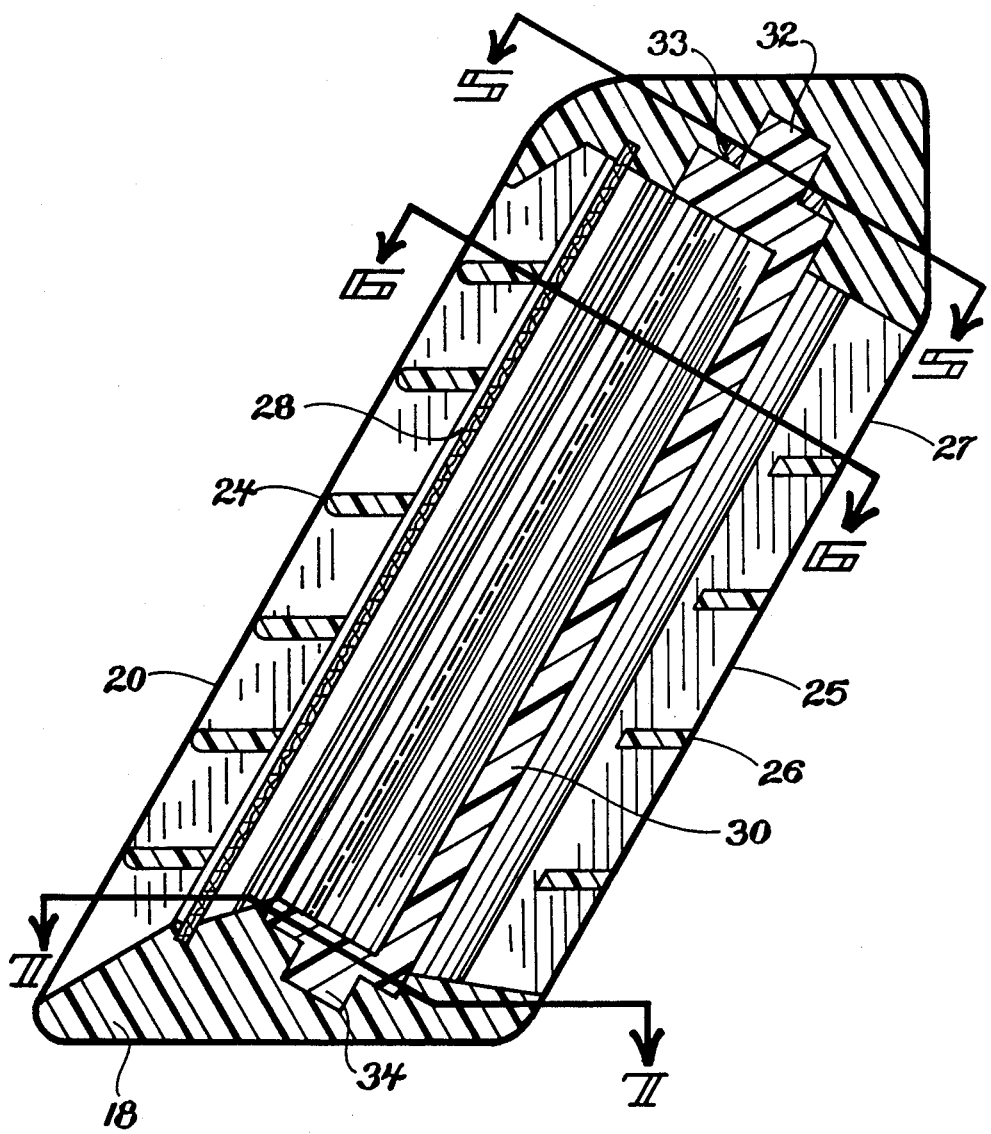
FIG. 4 is a longitudinal cross sectional view, taken along line 4—4 of FIG. 2.

With reference now to the drawings, and in particular to FIG. 1 thereof, a new and improved automobile ventilation device embodying the principles and concepts of the present invention and generally designated by the reference numeral 10 will be described.

More specifically, it will be noted that the first embodiment 10 of the invention includes a transparent mounting plate 12 provided with top 16 and bottom 14 flanged end edges. A generally rectangular airscoop body portion 18 is secured on one side of the mounting plate 12. The airscoop body portion 18 has an inclined front face 20, generally parallel planar top 21 and bottom 23 faces, and an inclined back face 25. The front face 20 of the airscoop 18 is provided with an air inlet opening for directing air into the interior of the airscoop 18 through the plate 12 and into the interior of a vehicle. The arrows in FIG. 1 illustrate the relative air flow encountered when the device is mounted in the driver's (left) side window channel of a vehicle, with the vehicle proceeding a forwardly direction.

As shown in FIG. 2, the front face 20 of the airscoop 18 is provided with a generally rectangular air inlet opening 22. A plurality of louvers 24 are spaced vertically along the extent of the air inlet opening 22. As illustrated, both end edges 14 and 16 of the plate 12 are provided with a double flanged construction, thus forming a generally rectangular central channel along each edge. In use, the plate 12 is secured in the window channel of a vehicle by engagement of the edge of the window glass within the bottom flanged edge. This construction is substantially as disclosed in U.S. Pat. No. 4,111,106, the disclosure of which is hereby incorporated by reference.

In FIG. 3, a top view of the ventilation device of the present invention is provided.

In the longitudinal cross sectional view of FIG. 4, the adjustable air control valve 30 is illustrated. The valve 30 has an elongated generally cylindrical shape, however an arcuate portion of the cylinder along the length of the valve 30 has been removed, as is better illustrated in the transverse cross sectional view of FIG. 6. The valve 30 is provided with cylindrical axle portions 32 and 34 which are rotatably mounted in correspondingly shaped recesses formed in the airscoop body portion 18. An adjustment lever mounting ring 33 is secured for rotation with the upper axle portion 32. As previously described, a series of vertically spaced louvers 24 are spaced along the air inlet opening 20. A filter or bug screen 28 is located in parallel spaced relation behind the generally rectangular air inlet 20. Louvers 26 are vertically spaced along a generally rectangular air outlet opening 27.

As illustrated in FIG. 5, an actuating lever 35 is secured to the ring 33. The actuating lever 35 is adapted to extend into the interior of a vehicle through an elongated generally rectangular opening 39 formed in the mounting plate 12. The adjustment lever 35 is movable within a range of adjustment as indicated in dotted lines, within a slot formed in the airscoop body portion 18.

As illustrated in FIG. 6, the control valve 30 is formed of a cylindrical configuration, with an arcuate axial portion removed. Thus, the air control valve 30 has a transverse cross sectional shape which resembles a crescent. This provides an arcuate air control surface 36. By manipulation of the adjustment lever 35 (FIG. 5), the control valve 30 may be rotated about its central longitudinal axis between the illustrated position and the position illustrated in dotted outline. An adjustable air vent assembly 40 may be regulated to open or close the opening 39, by manipulation of an adjustment wheel 38. The air vent adjustment mechanism will be subsequently described in greater detail. In the illustrated position of the air control valve 30, air enters the air inlet 22, passes through the screen 28 and is directed by the arcuate surface 36 through the air vent assembly 40 and through the opening 39 into the interior of a vehicle. By positioning the air valve 30 to orient the air directing surface 36 in the position illustrated in dotted lines, air passing through inlet 22 and screen 28 will be prevented from entering the vehicle interior through the opening 39. As the vehicle and attached airscoop 18 are moved through the air, a low pressure pocket is created at the back surface 25 of the airscoop 18. This creates an induction effect which results in air being exhausted through the opening 39, the vent 40 and the air outlet opening 27. Thus, by regulating the position of the control valve 30, the volume of air entering and leaving the vehicle may be regulated.

In FIG. 7, a transverse cross sectional view taken along line 7—7 of FIG. 4 illustrates the vent adjustment wheel 38. A compass 42 is embedded within the airscoop body portion 18. The compass 42 is of the conventional type which utilizes a spherical indicator suspended within a fluid filled ball.

Figures 8, 9:
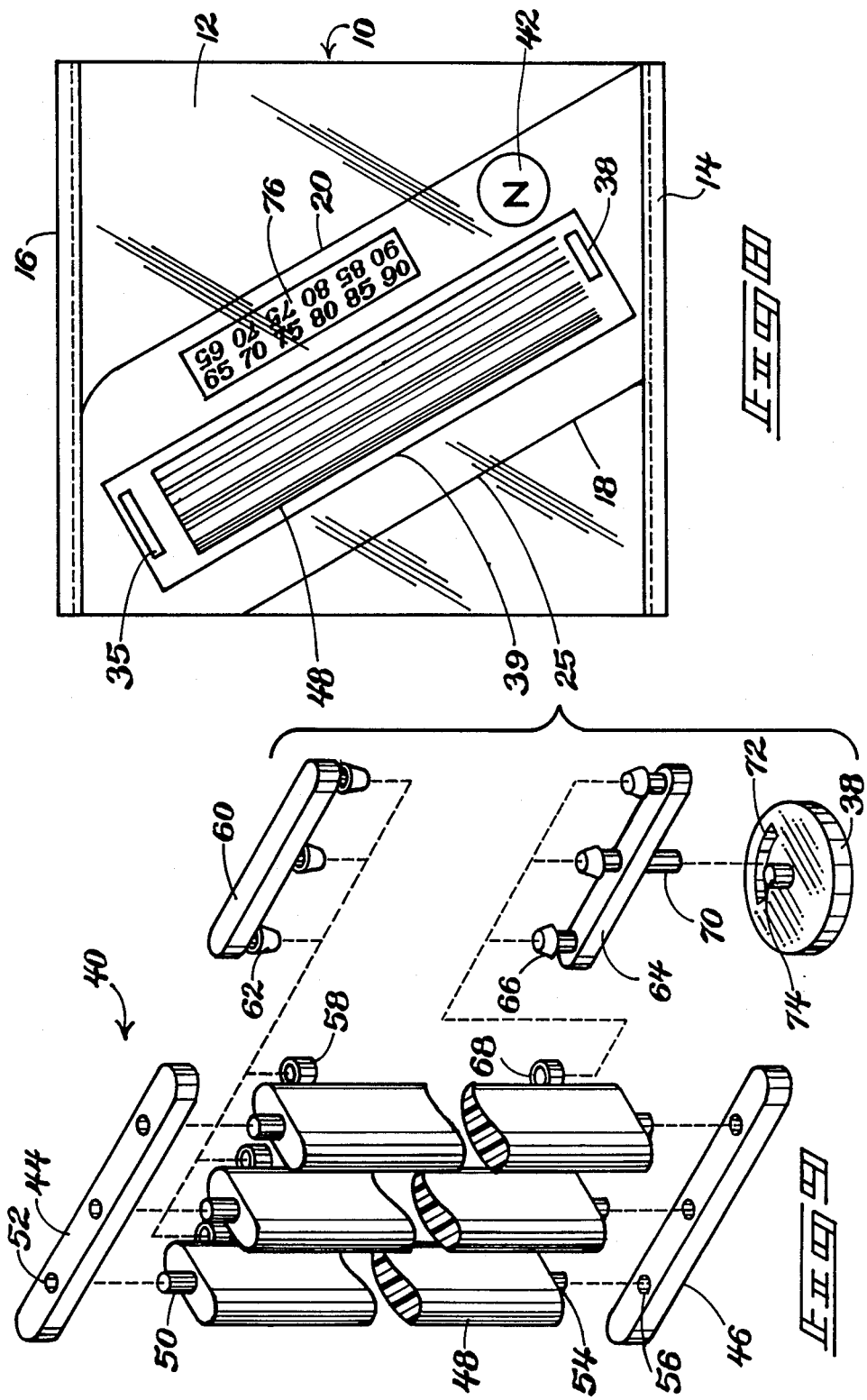
FIG. 8 is a side view of the ventilation device of the present invention, as seen from the interior of a vehicle.
FIG. 9 is an exploded perspective view illustrating the adjustable air vent assembly of the ventilation device of the present invention.

FIG. 8 provides a side view of the ventilation device 10 of the present invention, as seen from within a vehicle interior. As aforementioned, a generally rectangular opening 39 is formed through the transparent mounting plate 12. This allows air to communicate between the airscoop 18 through the vents 48 and into the vehicle interior. The volume and direction of air flow may be regulated by manipulation of the air control valve actuation lever 35 and the air vent adjustment wheel 38. The compass 42 is visible to occupants of the vehicle through the transparent mounting plate 12. A thermometer 76 is also embedded within the airscoop body portion 18 and is preferably of the conventional type which is formed of a flat strip of material which changes colors to indicate changes in temperature. The thermometer 76 is provided with dual inverted temperature scales to enable the thermometer to be easily read upon inversion of the mounting plate 12. The mounting plate 12 may be inverted from top to bottom in order to mount the device on the opposite side of a vehicle. The device has previously been illustrated and described with reference to mounting on the left or driver's side window channel of a vehicle. This results in the edge 14 of the mounting plate 12 as being the bottom edge and the edge 16 being the top edge. Similarly, the face 20 of the airscoop 18 is the front or leading edge and the face 25 is the rear or trailing edge. By inverting the mounting plate 12 from top to bottom, the edge 16 becomes the bottom edge and the edge 14 becomes the top edge. As may now be readily understood, this also results in face 25 in becoming the front or leading edge and face 20 becoming the rear or trailing edge. The controls and 35 and 38, although inverted from the illustrated position, will still be readily accessible to vehicle occupants. Because of the dual scale of the thermometer 76, the thermometer 76 would also be easily readable.

In FIG. 9, an exploded perspective view is provided of the adjustable vent assembly 40. A plurality of vent slats 48 extend between stationary mounting bars 44 and 46. Each of the vent slats 48 is provided with top 5@and bottom 54 axle portions which are rotatably received within apertures 52 and 56 in the mounting bars 44 and 46. A pair of sockets 58 and 68 are provided on each of the vent slats 48 for engagement with pin portions 62 and 66 of top 60 and bottom 64 connecting struts. The bottom connecting strut 64 is provided with an actuating rod 70 which is received within an arcuate slot 72 formed within the adjustment wheel 38. The adjustment wheel 38 is mounted for rotation within a recess in the airscoop 18 by an axle pin 74. The mounting of the adjustment wheel 38 is illustrated in FIG. 7. The mounting of the vent assembly 40 is best illustrated in FIG. 6. As may now be readily understood, rotation of the wheel 38 causes the strut 64 to reciprocate transversely to the longitudinal axis of the vent slats 48. Because of engagement of the pin 66 within the socket 68 on the vent slats 48, this causes the slats 48 to rotate about axle portions 50 and 54. Thus, by manipulation of the wheel 38, the vent slats 48 may be adjusted between open and closed positions in order to regulate air flow therethrough.

As is now apparent, the ventilation device 10 of the present invention may be quickly and easily inverted to allow mounting of the device on either side of a vehicle. While the device has been illustrated with a single filter screen 28 (FIG. 4) situated adjacent the air inlet opening 20, it should be understood that a second screen may be similarly situated adjacent the opening 25, to allow air filtration upon inversion of the device.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automobile ventilation device adapted for mounting in a window of an automobile, comprising:
   a rectangular transparent mounting plate provided with dual flanged top and bottom edge portions for allowing inversion of said mounting plate for alternative engagement in both driver and passenger side windows of an automobile;
   an air scoop mounted on said mounting plate, a leading side of said air scoop having an elongated air inlet opening communicating with a hollow interior, a lateral opening directed transversely to said air inlet opening communicating from said hollow interior through said mounting plate to an automobile interior, and an air outlet opening on a trailing side of said air scoop;

an elongated solid cylindrical air control valve mounted for limited reciprocal rotation about a central axis in said air scoop interior, said air control valve extending generally parallel to said air inlet opening and having an arcuate axial section removed to provide an arcuate air control surface;

a control lever connected to said air control valve and extending into the automobile interior through a slot in said mounting plate for allowing manual rotation of said air control valve by automobile occupants;

said air control valve being rotatable to a first position in which said arcuate air control surface faces said air inlet opening to direct air through said lateral opening into an automobile interior, and to a second position in which said arcuate air control surface faces rearwardly for inducting air from an automobile interior out said lateral opening to said air outlet opening;

an adjustable vent in said lateral opening of said air scoop formed by a plurality of spaced rotatably mounted slats;

a plurality of connecting struts connecting said slats for simultaneous rotation;

an actuating rod secured to one of said connecting struts; and a control wheel rotatably mounted in said air scoop and having a slot engaging said connecting rod, said control wheel partially extending through a slot in said mounting plate to enable adjustment of said vent by automobile occupants.

2. The automobile ventilation device of claim 1, further comprising a compass having a spherical indicator suspended in a fluid filled ball within said air scoop.

3. The automobile ventilation device of claim 1, further comprising a thermometer having dual inverted scales on said air scoop.

4. An automobile ventilation device adapted for mounting in a window of an automobile, comprising:

a rectangular transparent mounting plate provided with dual flanged top and bottom edge portions for allowing inversion of said mounting plate for alternative engagement in both driver and passenger side windows of an automobile;

an air scoop mounted on said mounting plate, a leading side of said air scoop having an elongated air inlet opening communicating with a hollow interior, a lateral opening directed transversely to said air inlet opening communicating from said hollow interior through said mounting plate to an automobile interior, and an air outlet opening on a trailing side of said air scoop;

an elongated solid cylindrical air control valve mounted for limited reciprocal rotation about a central axis in said air scoop interior, said air control valve extending generally parallel to said air inlet opening and having an arcuate axial section removed to provide an arcuate air control surface;

a control lever connected to said air control valve and extending into the automobile interior though a slot in said mounting plate for allowing manual rotation of said air control valve by automobile occupants; and said air control valve being rotatable to a first position in which said arcuate air control surface faces said air inlet opening to direct air through said lateral opening into an automobile interior, and to a second position in which said arcuate air control surface faces rearwardly for inducting air from an automobile interior out said lateral opening to said air outlet opening.

5. The automobile ventilation device of claim 4, further comprising a compass having a spherical indicator suspended in a fluid filled ball within said air scoop.

6. The automobile ventilation device of claim 4, further comprising a thermometer having dual inverted scales on said air scoop.

* * * * *